United States Patent [19]
Boucher et al.

[11] Patent Number: 5,186,596
[45] Date of Patent: Feb. 16, 1993

[54] LOADING AND UNLOADING APPARATUS

[76] Inventors: Paul Boucher, 202 Flanders, Maidston, Ontario; Mario Boucher, 205 Michael Drive; John Ford, 270 Woodbridge Drive, both of Tecumseh, Ontario; Gregg Stephenson, 205-820 Mercer Avenue, Windsor, Ontario, all of Canada

[21] Appl. No.: 770,836

[22] Filed: Oct. 4, 1991

[51] Int. Cl.⁵ .............................................. B65G 67/02
[52] U.S. Cl. .................................. 414/395; 198/303; 198/721; 198/735.6; 198/748; 198/861.2; 414/398; 414/400
[58] Field of Search ............................ 414/390-393, 414/395, 396, 398, 400; 198/303, 721, 735.6, 748, 861.2

[56] References Cited

U.S. PATENT DOCUMENTS

| | | | |
|---|---|---|---|
| 3,186,566 | 6/1965 | Spinanger et al. | 414/395 |
| 3,397,802 | 8/1968 | Hinchee | 414/396 |
| 3,710,961 | 1/1973 | Bomstein | 414/396 |
| 3,727,777 | 4/1973 | Hanson | 414/400 |
| 3,780,893 | 12/1973 | Lässig et al. | 414/400 X |
| 3,952,887 | 4/1976 | Lutz | 414/392 |
| 5,054,987 | 10/1991 | Thornton | 414/400 X |

Primary Examiner—David A. Bucci
Attorney, Agent, or Firm—Jeffrey T. Imai; Arne I. Fors

[57] ABSTRACT

A longitudinal extensible platform comprises a plurality of framed sections hingedly joined together. Each framed section comprises a first set of ground engaging rollers and a second set of load engaging rollers extending transversely of the framed section. A drive is mounted below the surface of the loading dock for driving an endless chain. The extensible platform is drivingly engaged to the endless chain and adapted for longitudinal movement therealong. The extensible platform has a platen at a forward end hingedly engaging the first framed section. The extensible platform is provided with a driven pusher assembly mounted thereon. The pusher assembly extending upwardly for abutting with the load resting on the extensible platform.

9 Claims, 7 Drawing Sheets

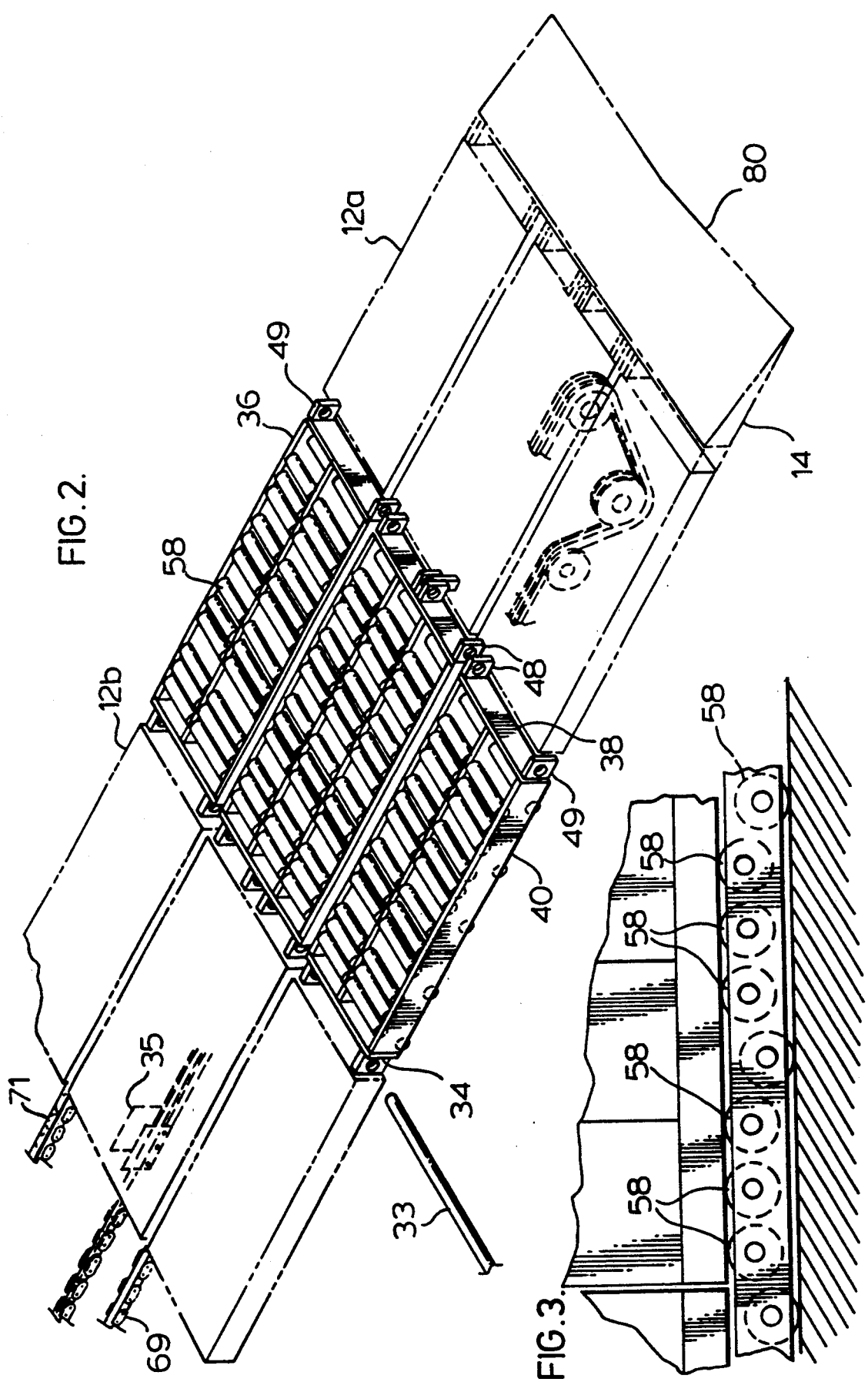

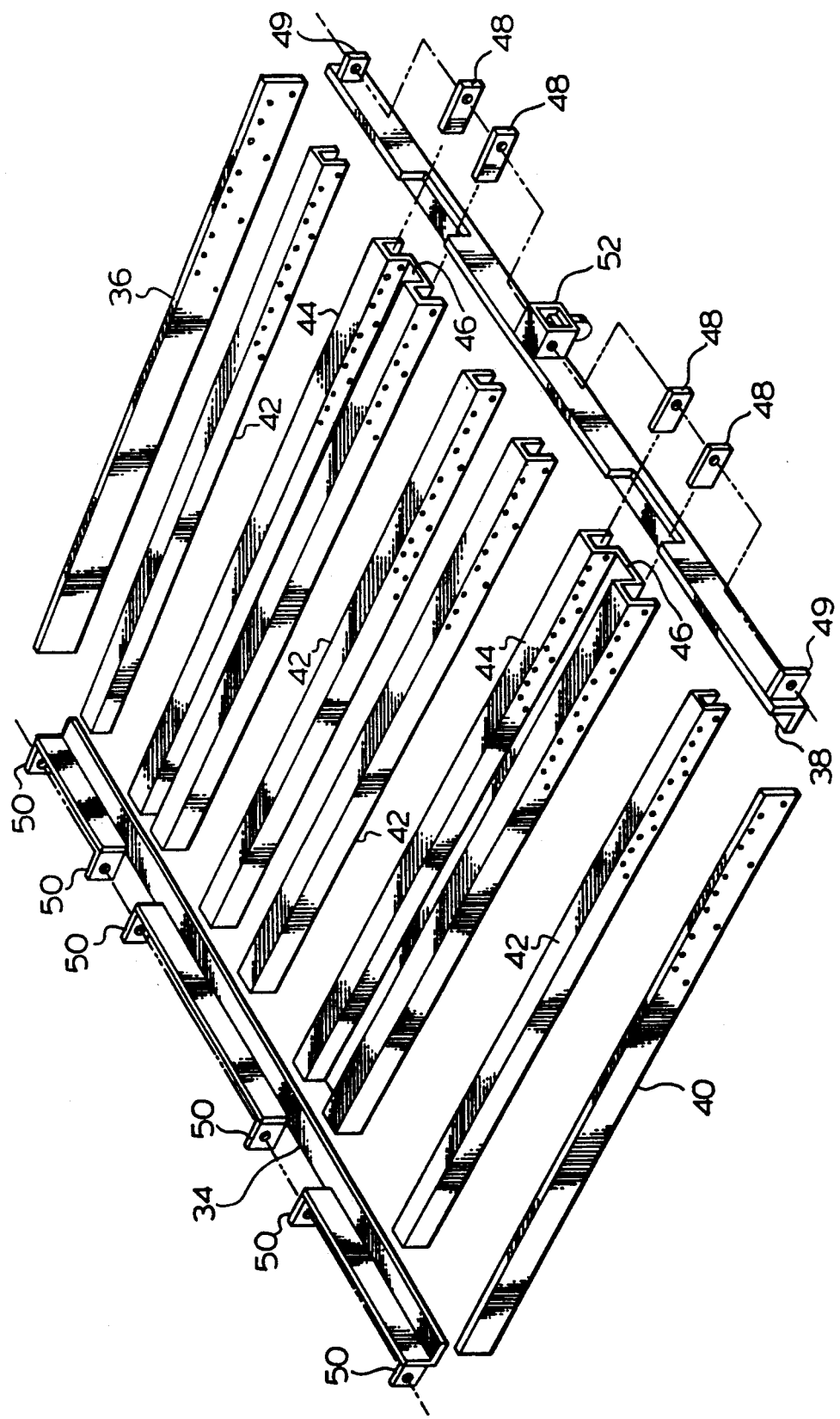

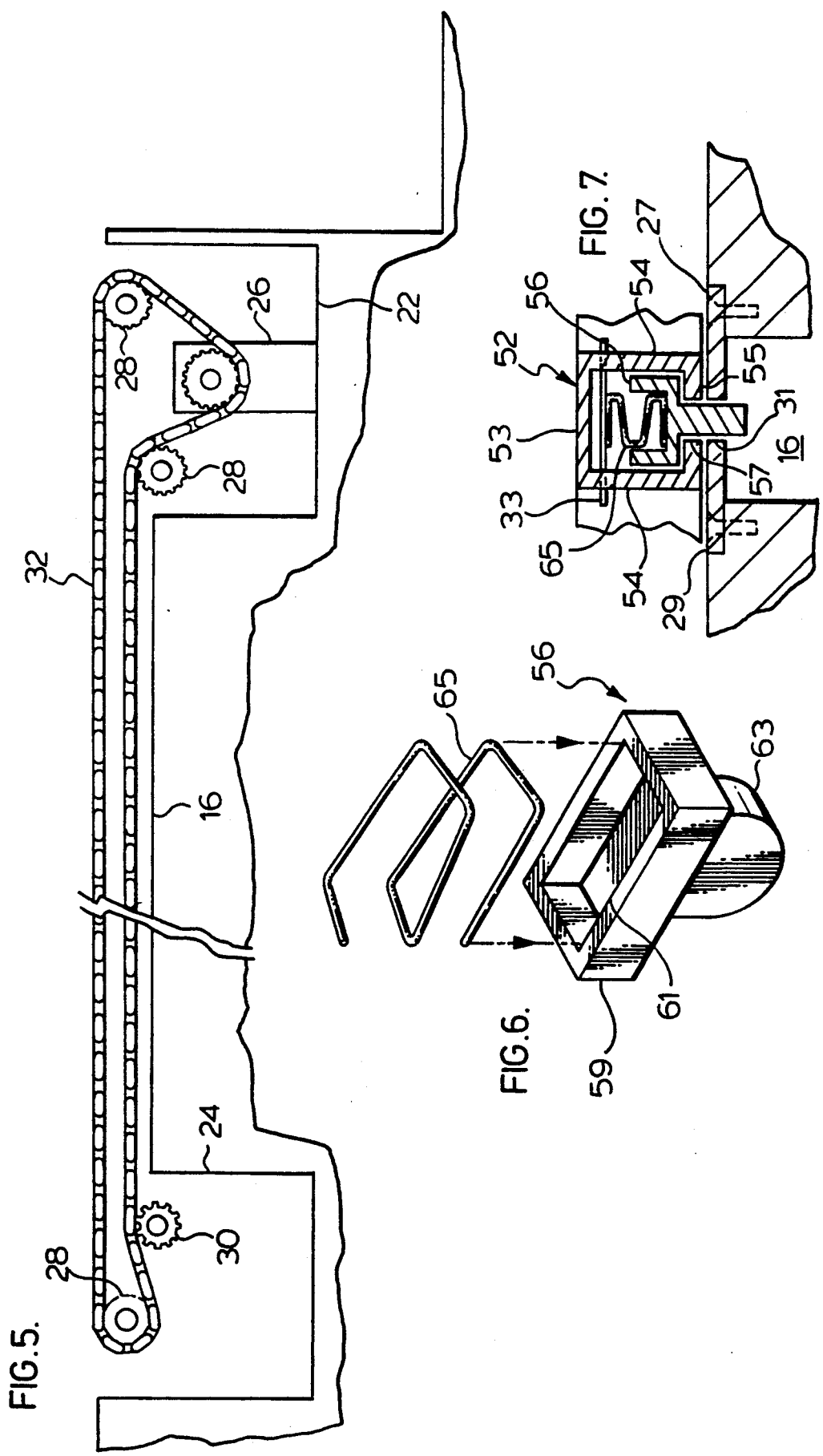

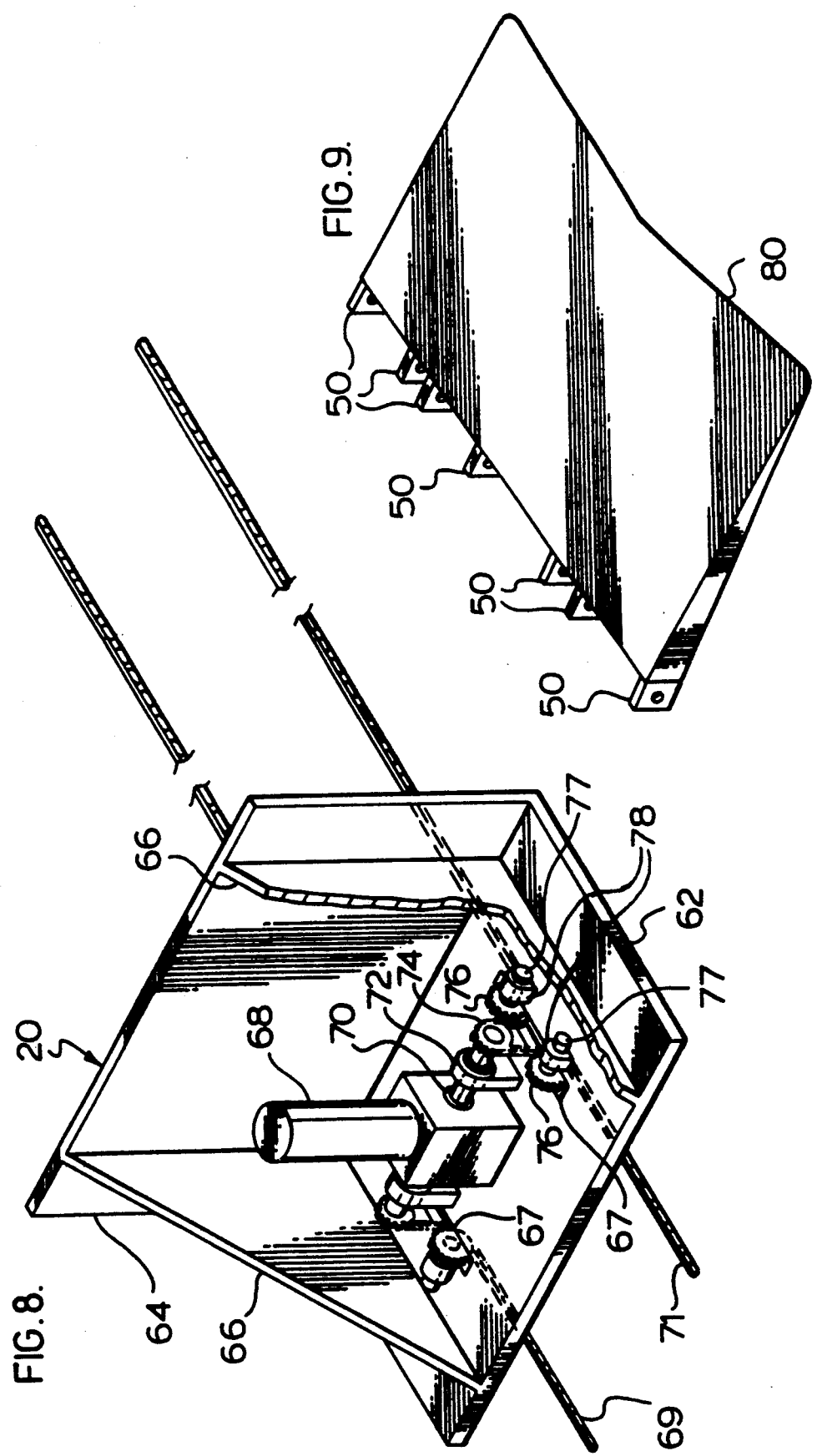

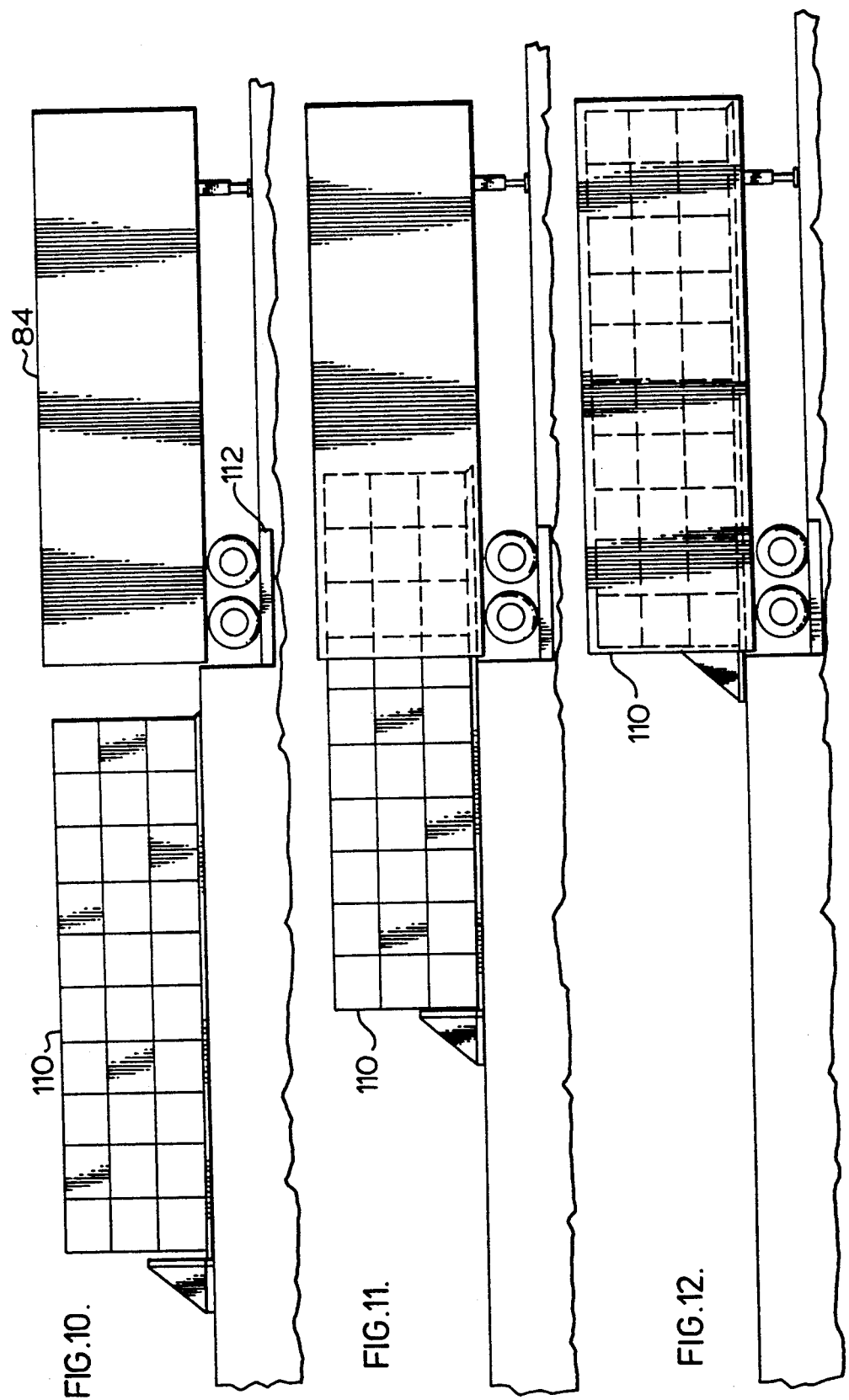

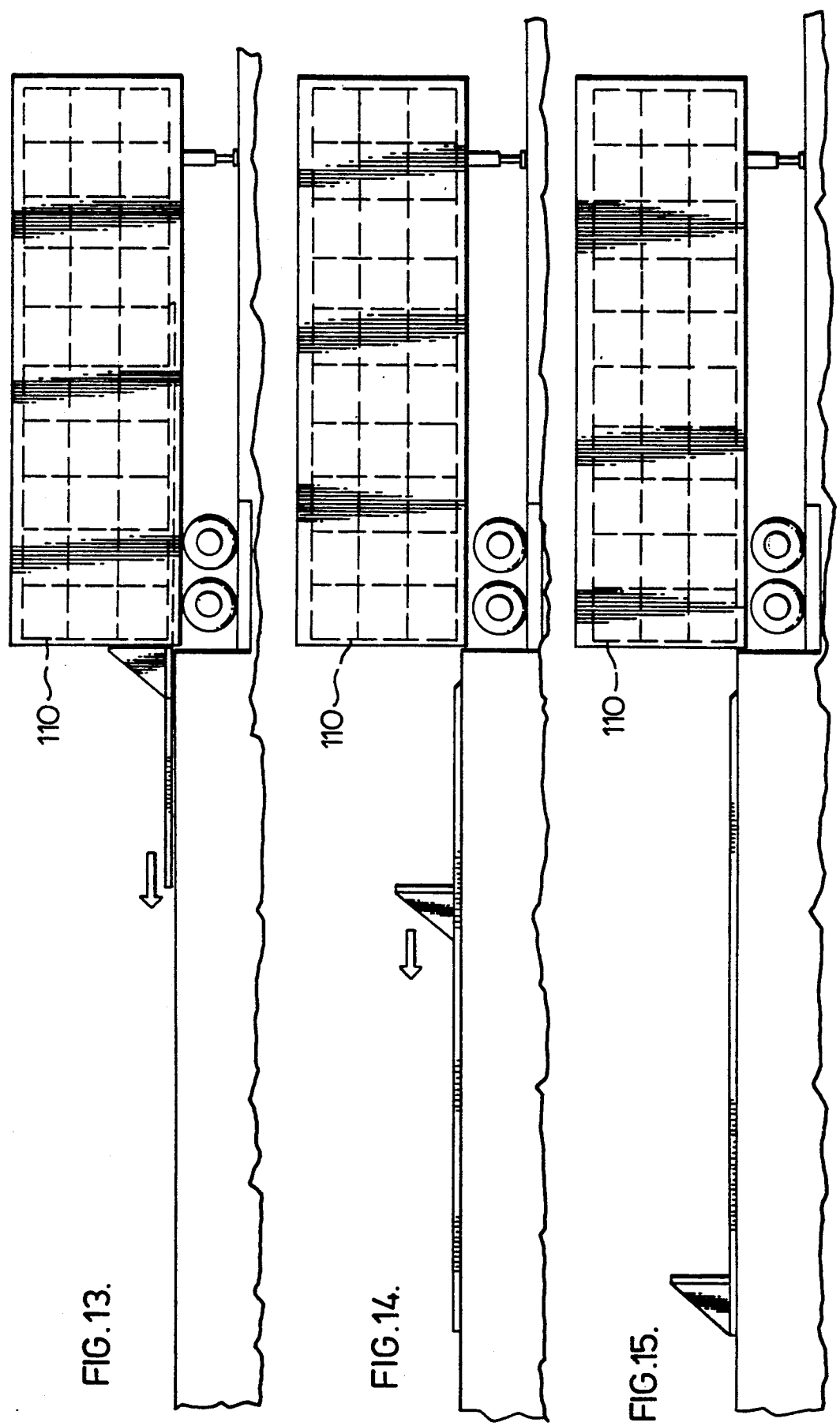

LOADING AND UNLOADING APPARATUS

FIELD OF INVENTION

This invention relates to an apparatus for handling loads, particularly for the loading and unloading of vehicles and in particular trucks.

BACKGROUND OF INVENTION

There have been many mechanised systems which have been developed in an attempt to provide an inexpensive yet durable means for loading and unloading vehicles. The systems generally comprise an extensible conveyor system which is extended from a point outside of a vehicle, into the interior of the vehicle and beneath a load which is supported in spaced relationship to the floor of the vehicle. Hydraulic lifting devices raise the conveyor section to engage the underside of the load, lift the load off the floor of the vehicle and then retract the conveyor section to remove the load from the vehicle. The reverse steps are undertaken to load a vehicle.

One such mechanised system has been disclosed in U.S. Pat. No. 3,952,887. This loading and unloading apparatus has proven to be unsatisfactory as the device requires the installation of special rests to be installed on the floor of the interior of the vehicle. If a vehicle does not have such rests, the vehicle must be loaded or unloaded in the conventional manner.

Still other devices such as disclosed in U.S. Pat. No. 3,727,777, are designed for loading vehicles in an automated fashion. These devices, however, are not suitable for unloading a vehicle because the slide assembly is not able to be wedged beneath the load from the floor of the vehicle to raise the load therefrom. Therefore these devices have a limited use.

SUMMARY OF INVENTION

The disadvantages of the prior art may be overcome by providing an apparatus which loads and unloads vehicles without requiring the vehicles to be installed with special rests for supporting a load.

It is a further object of this invention to provide an apparatus which is adapted to have an extensible platform which can be driven between a palletized, boxed, caged or similar load and the floor of the vehicle, raising the load off the floor and onto the extensible member and which can then be retracted thereby removing the load from the vehicle.

It is a further object of this invention to provide a platen at the front of the extensible platform which can be adapted for particular types of loads which are consistently transported in either a palletized, boxed or caged fashion.

According to one aspect of the invention there is provided a longitudinal extensible platform comprising a plurality of framed sections hingedly joined together. Each framed section comprises a first set of ground engaging rollers and a second set of load engaging rollers extending transversely of the framed section. A drive means is mounted below the surface of the loading dock for driving an endless chain. The extensible platform is drivingly engaged to the endless chain and adapted for longitudinal movement therealong. The extensible platform has a platen at a forward end hingedly engaging the first framed section. The extensible platform is provided with a driven pusher assembly mounted thereon. The pusher assembly extending upwardly for abutting with the load resting on the extensible platform.

When the extensible platform is in a retracted position and resting fully on the loading dock, the entire load to be loaded onto a vehicle may be placed on the extensible platform. With the load fully in place, the main drive is engaged driving the extensible platform and the pusher assembly into the vehicle. Once the front platen has reached the forward limit of its progress, either the forward limit of the loading area of the vehicle or a previously loaded load, the main drive is disengaged and reversed causing the extensible platform to retract from the vehicle. At the same time, the pusher assembly drive is activated causing the pusher assembly to move relative to the extensible platform but stationary with respect to the vehicle. The load is pushed forward relative to the extensible platform allowing the extensible platform to be retracted from the vehicle and at the same time causing the load to remain within the vehicle. Once the extensible platform has been fully retracted from the load, the pusher assembly drive is reversed allowing the pusher assembly to return to its first position. The load remains fully within the vehicle.

To unload, the steps are reversed. The platform with the pusher assembly in a retracted position is driven into the vehicle, wedging the load upwardly and onto the platform and upon retraction of the platform removing the load from the vehicle.

DETAILED DESCRIPTION OF THE DRAWINGS

In drawings which illustrate the preferred embodiment of the invention,

FIG. 2 is a sectional view of the platform of the embodiment of FIG. 1,

FIG. 3 is a partial side view of the platform of FIG. 1 having a load thereon,

Figure 1:
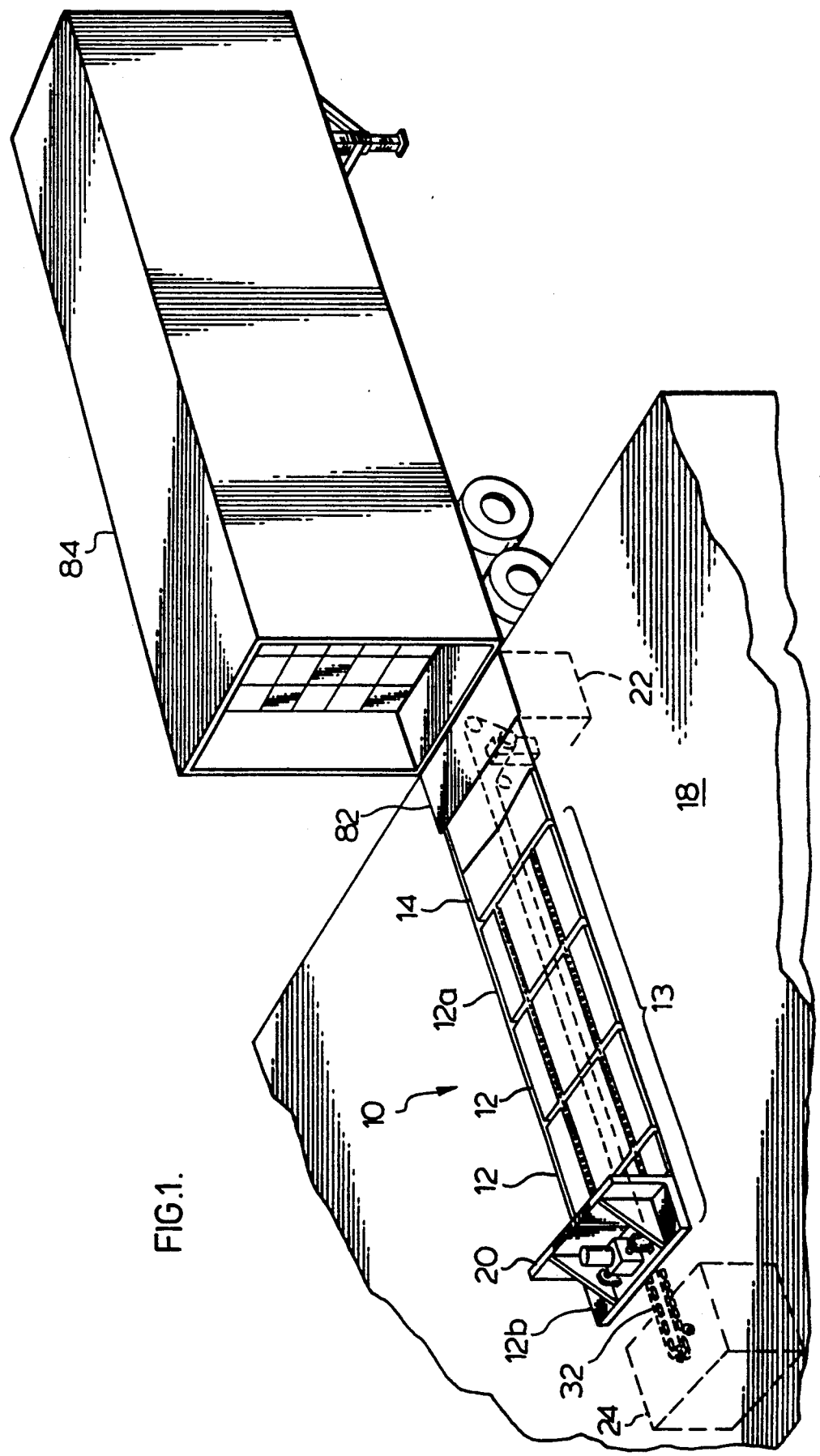
FIG. 1 is perspective view of the preferred embodiment.

FIG. 4 is an exploded view of the sled of the platform of the embodiment of FIG. 1, FIG. 5 is a partial side elevational view of the main drive of the embodiment of FIG. 1, FIG. 6 is a perspective view of the dog and spring of the embodiment of FIG. 1, FIG. 7 is a partial end view of the guide of the embodiment of FIG. 1, FIG. 8 is a perspective view of the pusher assembly of the embodiment of FIG. 1, FIG. 9 is a perspective view of the platen of the embodiment of FIG. 1, FIG. 10 is a side elevational view of the embodiment of FIG. 1 with a load thereon ready for loading, FIG. 11 is a side elevational view of the embodiment of FIG. 1 with a load thereon loading onto a vehicle, FIG. 12 is a side elevational view of the embodiment of FIG. 1 with a load thereon fully in the vehicle, FIG. 13 is a side elevational view of the embodiment of FIG. 1 with a load thereon, and the platform retracting, FIG. 14 is a side elevational view of the embodiment of FIG. 1 with a load removed from the platform, and FIG. 15 is a side elevational view of the embodiment of FIG. 1 with a load removed and the platform ready for loading.

DETAILED DESCRIPTION OF THE PREFERRED EMBODIMENT

The apparatus of the present invention is generally illustrated in FIG. 1 as 10. The apparatus generally comprises sleds 12 which are pivotally joined together to form a longitudinally extending platform 13. At the forward end of the platform 13, platen 14 is pivotally connected to the first sled 12a. Mounted on the platform 13 is a pusher assembly 20. Pusher assembly 20 is adapted to travel along the length of platform 13.

As illustrated in FIGS. 5 and 7, loading dock floor 18 is provided with a track 16 extending below the surface of floor 18 substantially perpendicular to the edge of the loading dock floor 18. Communicating with track 16 is a drive pit 22 at the end nearest the load dock edge and a pulley pit 24 at the opposite end of track 16. Drive motor 26 is mounted within drive pit 22.

A drive chain 32 extends along the track 16 between idler pulleys 28 mounted within the pulley pit 24 and the drive pit 22, to present an endless driven chain. Take-up pulley 30 rotatably mounted within pulley pit 24 tensions the endless chain 32. The top of track 16 is covered by two plates 27 and 29 to present a guide track 31 extending along the length of track 16.

With reference to FIGS. 2 and 4, each sled 12 comprises a rear frame member 34, a side frame member 36, a forward frame member 38 and a second side frame member 40, defining a substantially rectangular frame unit. Each sled 12 has a low profile for reasons which will become apparent. Sled 12 has a width slightly less than the width of the interior of a standard trailer bed. The combined length of sleds 12 (platform 13) should be at least the length of the interior of a standard trailer bed. However, it is apparent that the size of platform can be configured to suit special size trucks or trailers.

Extending between rear frame 34 and front frame 38 are structural members 42 and pusher track member 44, which are welded thereto. Structural members 42 have at least two vertical surfaces having a height slightly less than the frame members and a horizontal surface extending therebetween defining an inverted U-shape channel. Pusher track member 44 has a double inverted U-shaped configuration as illustrated in FIG. 4 presenting a recess 46 between the two inverted U-shaped sections.

Rear frame member 34 and forward frame member 38 have a substantially "L" shaped cross-section. At approximately 2/7 ths of the distance from each end of the members, the vertical portion of the "L" is removed, presenting two openings.

Side frame members 36 and 40, support members 42 and pusher track members 44 are provided with apertures having the same pattern. The pattern is illustrated in FIG. 3, comprising a successive sequence of equally spaced apertures, three at a height nearer the upper surface of the member followed by a single aperture equally spaced nearer the lower edge of the member.

Side frame members 36 and 40, support members 42 and pusher track members 44 are preferably manufactured from cold bar stock and bent to the desired cross-sectional shape.

In the preferred embodiment, the framed sections are welded together to form an integral unit able to withstand the desired loads to be carried by the sleds. The side frame members 36, 40, support members 42 and pusher track members 44 extend parallel to each other and are equally spaced from each other. Further, transverse spacers may extend between the longitudinally members to increase the structural integrity of the framed sections.

Extending between corresponding apertures of side frame member 36 and support member 42 are a plurality of like journalled rollers 58. The rollers 58 are low profile rollers which are generally suited to support heavy loads. Each roller has a roller surface and spring loaded axles which extend beyond each end of the roller to engage with a corresponding pair of apertures in side frame members 36 and 40, support members 42 and pusher track members 44. The axles can be depressed to insert the roller 58 between adjacent side frame members 36 and 40, support members 42 and pusher track members 44 and upon release of the axles they extend into the aligned holes in the adjacent members. In a like manner, the plurality of rollers are installed between side frame members 36 and 40, support members 42 and pusher track members 44.

Since the apertures in side member 36 are offset from the mid-height presenting a shorter distance from the centre of the aperture to one edge of the side member and a longer distance to the opposite edge, the radius of the roller must exceed the shorter distance but less than the longer distance so that the roller surface is beyond the shorter distance as illustrated in FIG. 3. The rollers installed in apertures nearest the upper surface of the framed section present a plurality of load engaging rollers whereas the rollers mounted in the lower apertures present a plurality of ground engaging rollers. Seven rows of rollers are used in the preferred embodiment.

In the preferred embodiment, the sled 12 has two pusher track members 44 spaced inwardly from opposite sides of the sled 12 and aligned with the openings in the vertical portion. Support members 42 are uniformly spaced between side frame member 36 and pusher track member 44 and between pusher track member 44 and side frame member 40. Further, a pair of support members are equally spaced between pusher track members to present seven rows for installation of the rollers.

At the forward end of each of pusher track member 44, lugs 48 extend forwardly. Lugs 48 are mounted in the inverted U-shaped channels presented at the end of pusher track members 44 and extend through the opening in the vertical portion of the front frame member 38. Near the forward end of side members 36 and 40, lugs 49 extend forwardly. Lugs 49 can be integral with the side members 36 and 40. Spaced along the rear frame member 34, lugs 50 extend rearwardly therefrom. Lugs 50 are spaced so as not to align with the forwardly extending lugs 48 and 49. Each lug has an aligned transversely extending bore.

At the mid-point of the forward frame section 38 is a housing 52 which extends forwardly. Housing 52 is bounded by two forwardly extending lugs 54 each having an aligned transversely extending bore therethrough, an upper plate 53 and a lower plate 55. Lower plate 55 has a vertically extending rectangular aperture 57.

Dog 56 is a spring loaded guide. The head 59 is rectangular in plan view, having a rectangular recess 61 in the top surface. The lower portion of dog 56 is a semi-disc 63 extending downwardly. The width and diameter semi-disc 63 corresponds with the sizing of aperture 57 allowing the semi-disc to extend therethrough when installed. Recess 61 is sized to receive a rectangular spring 65.

To install dog 56 into housing 52, the spring 65 is inserted into recess 61 and compressed, dog 56 and spring 65 are inserted within housing 52 and then semi-disc 63 is projected through aperture 57, biasing dog 56 in a down position. Dog 56 extends into the track 16 of loading dock floor 18 to rest within guide track 31.

The sleds are joined together by placing like sleds in a front to back arrangement until the apertures of the rearwardly extending lugs align with the apertures of the forwardly extending lugs. Rod 33 is inserted through the apertures of the lugs and hingedly engaging the sled. Cotter pins (not illustrated) are used to retain rods on the lugs. The desired number of sleds are joined together in a like manner to present extensible platform 13. Dogs 56 of each sled 12 extend downwardly to engage within guide track 31. The rearmost sled 12b is suitably fixed to the endless chain 32 at 35.

Extensible platform 13 has two continuous tracks presented by recess 46 of pusher track member 44. Pusher chains 69 and 71 rest within each of the continuous tracks. The chains extend the entire length of platform 13 and are affixed at both end of the tracks. The length of the pusher chains is slightly greater than the length of pusher track.

With reference to FIG. 8, pusher assembly 20 comprises a base plate 62, a load engaging plate 64 and two braces 66. Base plate 62 and load plate 64 are joined along one edge at substantially a right angle to each other. Braces 66 extend between base plate 62 and load plate 64 to form a 45° brace spaced inwardly from each end of the pusher assembly 20.

Base plate 62 is provided with two like rectangular apertures 67 which extend longitudinally. Apertures 67 are spaced from the centre line of the base plate a distance substantially equal to the distance from the centre line of the platform 13 to the pusher tracks 46.

A pusher drive motor 68 is centrally mounted between brace plates 66. Pusher motor has a transversely extending drive shaft 70 journalled and supported by mounts 72. Primary gears 74 are mounted at the ends of shaft 70. Pusher gears 76 are mounted on transversely extending shafts 77 which are journalled and supported on mounts 78. Pusher gears 76 extend through aperture 67. The shafts 77 are spaced from drive shaft 70, one shaft forwardly thereof and one shaft rearwardly thereof. Drive shaft 70 is spaced above the shafts 77. The arrangement is illustrated in FIG. 8. Pusher chain is threaded under the forward gear 76, up and about primary gear 74 and down and about rearward gear 76. Pusher assembly 20 rests on the rollers 58 of the platform 13 and can be driven along the length of the platform 13 as shaft 70 rotates or counter-rotates.

With reference to FIG. 9, the leading edge 80 of platen 14 has a thickness less than the trailing edge for a tapered shape. The leading edge 80 of platen 14 is narrower at the centre line of the platen than at the outer edges. The corners of the leading edge 80 are removed and rounded. Lugs 50 extend rearwardly from the rearward end of platen 14 in a similar manner to the sleds 12 for hingedly attaching the platen 14 to forward sled 12a. The platen 14 is mounted to the forward sled 12a in the same manner as the sleds are joined to form platform 13.

In operation, the platform 13 is normally in the retracted position fully on the loading dock 18, as illustrated in FIG. 10. A desired load is loaded onto the platform 13 to rest upon the plurality of journalled rollers 58. A truck or trailer 84 which is to be loaded is backed up to the edge of the loading dock 18 so that the truck or trailer 84 is substantially perpendicular thereto and in line with the platform 13 as illustrated in FIGS. 1 and 10. The rearmost wheel of the trailer will rest upon a load compensator 112 which automatically raises or lowers the trailer to adjust the floor of the trailer to be substantially level with the loading dock and to maintain such level as the trailer is loaded and unloaded.

When ready for loading, the pusher drive motor 68 is engaged causing the pusher assembly to move forwardly relative to the platform 13 until it abuts the load and then disengages. The main drive motor 26 is then engaged causing the endless drive chain 32 to be advanced driving the platform 13 to move forwardly relative to the loading dock 18 and into the trailer 84, as illustrated in FIG. 10. The leading edge 80 of platen 14 advances along the loading dock and up a ramp 82 which is provided to accommodate small differences between the trailer height and the loading dock height. As platen 14 advances into the trailer 84, sled 12a will also follow and advance into the trailer 84. Dog 56 will pushed upwardly as it engages ramp 82 and disengage from guide track 31. Dog 56 prevents lateral movement of the platform 13, guiding the platform into the vehicle as the main drive advances the platform into the vehicle.

As illustrated in FIGS. 11 and 12, platform 13 will continue to advance until a predetermined distance or the leading edge 80 of platen 14 reaches the forward end of the trailer 84 at which time, the main drive motor automatically disengages. The pusher assembly 20 has remained stationary relative to the platform 13.

With reference to FIGS. 13 to 15, the pusher drive motor 68 is then engaged pushing the load 110 forward until the load firmly abuts with the forward extent of the trailer 84, either the front of the trailer or a previously installed load. The main drive motor 26 is then reversed causing the platform 13 to retract from the trailer 84, as illustrated in FIG. 13. At the same time, the pusher drive motor 6 is engaged causing the pusher assembly 20 to move forwardly relative to the platform 13. The combined effect is that the pusher assembly 20 does not move relative to the trailer 84 causing the pusher assembly 20 to push the load relative to the platform 13. As the platform retracts the load slides off the rollers, down the platen onto the floor of the trailer. The process continues until the load 110 is fully within the trailer 84 and the platform 13 is out of the trailer 84. The pusher assembly 20 is returned to its rest position at the remote end of platform 13, as illustrated in FIG. 15.

To unload a trailer 84, the reverse steps are undertaken. The pusher assembly 20 is in its rest position. The trailer is backed up to the loading dock substantially perpendicular thereto and in line with the loading apparatus. Compensator 112 adjusts the height of the trailer floor. The main drive motor 26 is then engaged causing the endless drive chain 32 to be advanced driving the platform 13 forwardly relative to the loading dock 18 and into the trailer 84. The leading edge 80 of platen 14 frictionally engages the surface of the loading dock and then the floor of the trailer and will contact the load 110 at the load-floor junction. Since the leading edge 80 is narrower at the centre line, the outer most corners of the leading edge will contact the load first. The corners of the leading edge 80 will wedge beneath the load, causing the load to be raised as the platform 13 continues to be advanced. The platform 13 will travel relative to load, causing the load to travel up the platen 14 until it is transferred to the rollers 58. The platform continues the advance until the entire load to be removed is resting on the platform or until the leading edge 80 of the platen reaches the limit of the trailer or the platform has travelled a predetermined distance. Once the load fully rests upon the platform the main drive motor reverses and the platform is retracted from the trailer carrying the load with it. The main drive continues until the platform is fully on the loading dock and the load is completely removed from the trailer. The load can be conveniently removed from the platform 13 with hydraulic equipment.

The length and angle of the platen 14 is important for the operation of the apparatus. If the angled portion of the platen is too long and the angle too great, the platform will be unable to safely unload pallets at the forward end of the trailer. The preferred angle and length of angled portion is 4 degrees and 0.45 meters, respectively, which permits the palletted load to rest on the level portion of the platform rather than the angled portion of the platen.

It is apparent that the height of the platform and the angle of the leading of the platen are important features of the unloading operation of the invention. If the height of the platform increases, the requite power to wedge the platen beneath the load and to raise the load also increases. As the platen angle increases, so does the requisite power. For the preferred angle and length of platen, the main drive is a 7.5 hp motor and the pusher drive is a 3.0 hp motor.

In some cases, the pallets carrying the loads may require that the leading edge of the legs of the pallet are rounded so that the platen 14 is better able to engage the floor pallet junction and wedge the load off the floor of the vehicle. In some special loads where the pallets have unique feet, the shape of the leading edge may have to be modified to adapt it for engaging the load.

The foregoing is illustrative of the principles of the invention. Numerous modifications and changes will readily occur to those skilled in the art. It is therefore to be understood that certain changes in style, size and components may be effected without a departure from the spirit and scope of this invention and within the scope of the appended claims.

I claim:

1. A loading and unloading apparatus comprising a longitudinally extending platform adapted for longitudinal travel along a loading dock into a vehicle to be loaded or unloaded, said platform having a forward end and a rearward end,
    a plurality of low profile framed sections hingedly joined together, said sections each having a plurality of transversely extending surface engaging rollers adapted for rolling along the loading dock and a plurality of transversely extending load engaging rollers presenting a loading surface,
    a platen at the forward end of said platform, hingedly engaging a forwardmost framed section and having a wedge shape, a leading edge thereof adapted for frictionally engaging the loading dock,
    a pusher assembly mounted on the load engaging rollers and adapted for longitudinal movement along said platform, said pusher assembly having a forward end having a load pushing surface adapted to push a load as the pusher assembly advances relative to the platform, said pusher assembly comprises
        a base plate adapted for rolling along said load engaging rollers and
        a pusher plate extending substantially perpendicular to said base plate at a forward end thereof presenting said load pushing surface, and
    pusher drive means for effecting the longitudinal movement of said pusher assembly along said platform, said pusher drive means comprises
        a pusher drive mounted on said baser plate,
        a pusher drive chain longitudinally mounted within said platform and operatively engaging said pusher drive, whereby operation of said pusher drive advances said pusher assembly therealong and counter-operation retracts said pusher assembly therealong;
    a main drive means mounted below a surface of the loading dock for effecting the longitudinal travel of the platform along the loading dock; and
    a guide means for guiding said platform in the longitudinal direction; said guide means operably engaging between the loading dock and said platform; whereby to load a vehicle, a platform having a load resting on said loading surface and the pusher assembly in a retracted position is driven into the vehicle and the platform is retracted from the vehicle as the pusher assembly is advanced pushing the load off the platform, and whereby to unload a vehicle, the platform with the pusher assembly in a retracted position is driven into the vehicle, wedging the load upwardly and onto the platform and upon retraction of the platform removing the load from the vehicle.

2. An apparatus as claimed in claim 1 wherein said platform comprises a plurality of rows of rollers and said load engaging rollers are spaced to present a channel adapted to receive said pusher drive chain and said chain is affixed at opposite ends of said channel.

3. An apparatus as claimed in claim 2 wherein said pusher drive means includes gear means for engaging said pusher drive chain.

4. An apparatus as claimed in claim 2 wherein said main drive means comprises
    a driven endless chain mounted below said loading dock and operably connected to said platform, and
    said guide means comprises a guide track mounted on the surface of said loading dock and a dog mounted on said platform and adapted to engage said guide track.

5. An apparatus as claimed in claim 4 wherein each of said framed sections includes mounting means for receiving a dog biased in a downward orientation and adapted to disengage from said guide track as each of said framed sections of said platform is driven into the vehicle.

6. An apparatus as claimed in claim 4 wherein said rollers are journalled rollers mounted on said framed section, said load engaging surface is spaced above said framed section and said surface engaging rollers extend below said framed section.

7. An apparatus as claimed in claim 3 wherein said pusher drive means includes at least two like pusher drive chains and said platform has at least two channels therein and said pusher drive has at least two gear means for engaging said like pusher drive chains.

8. An apparatus as claimed in claim 6 wherein said rollers are spaced having in the order of three load engaging rollers for every surface engaging roller.

9. An apparatus as claimed in claim 1 wherein said platen is narrower at a longitudinal centre line of the platen than at side edges thereof.

* * * * *